| LENS | $N_D$ | V | RADII | THICKNESSES |
|---|---|---|---|---|
| I | 1.617 | 36.6 | $R_1 = +65.26$ | $t_1 =$ 2.6 |
| II | 1.572 | 57.4 | $R_2 = +21.46$ | $t_2 =$ 8.0 |
|  |  |  | $R_3 = -162.88$ | $S_1 =$ 47.0 |
| III | 1.517 | 64.5 | $R_4 = +74.60$ | $t_3 =$ 3.3 |
|  |  |  | $R_5 = \infty$ | $S_2 =$ 27.3 |
| IV | 1.525 | 54.8 | $R_6 = -16.75$ | $t_4 =$ 2.3 |
|  |  |  | $R_7 = +30.72$ | $S_3 =$ 1.3 |
| V | 1.584 | 46.0 | $R_8 = \infty$ | $t_5 =$ 7.1 |
|  |  |  | $R_9 = -12.51$ | $S_4 =$ 28.8 |
| VI | 1.621 | 36.2 | $R_{10} = +31.01$ | $t_6 =$ 1.4 |
| VII | 1.523 | 58.6 | $R_{11} = +10.98$ | $t_7 =$ 5.4 |
|  |  |  | $R_{12} = -61.62$ | $S_5 =$ 23.8 |
| VIII | 1.621 | 36.2 | $R_{13} = +22.76$ | $t_8 =$ 1.8 |
| IX | 1.523 | 58.6 | $R_{14} = +11.19$ | $t_9 =$ 7.8 |
|  |  |  | $R_{15} = -294.40$ | $S_6 =$ 98.6 |
| X | 1.649 | 33.8 | $R_{16} = -128.27$ | $t_{10} =$ 5.0 |
| XI | 1.517 | 64.5 | $R_{17} = +48.78$ | $t_{11} =$ 21.2 |
|  |  |  | $R_{18} = -48.78$ | $S_7 =$ 3.6 |
| XII | 1.517 | 64.5 | $R_{19} = +81.62$ | $t_{12} =$ 14.3 |
|  |  |  | $R_{20} = -81.62$ |  |

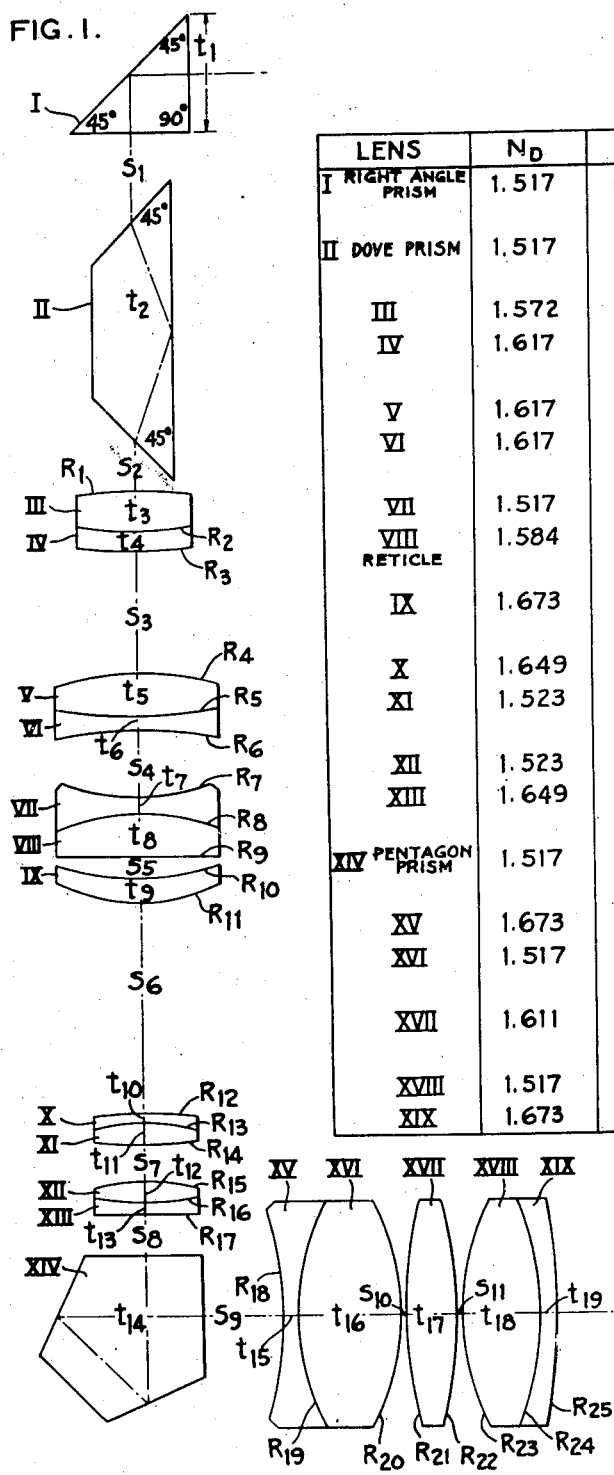

WILLY SCHADE
*INVENTOR*

BY
*ATT'Y & AG'T*

Patented May 4, 1948

2,441,036

UNITED STATES PATENT OFFICE 2,441,036

LENS SYSTEM FOR TELESCOPES

Willy Schade, Rochester, N. Y., assignor to Eastman Kodak Company, Rochester, N. Y., a corporation of New Jersey Application February 14, 1945, Serial No. 577,809

7 Claims. (Cl. 88—57)

This invention relates to sighting telescopes.

An object of the invention is to provide a sighting telescope with a clear sharp image over an extended field of view and of more economical construction than the sighting devices disclosed in copending application, Serial No. 511,062, by Altman, filed November 20, 1943, and which has become Patent No. 2,430,549, dated November 11, 1947. The Altman invention gives an image quality far superior to anything previously known and the present invention carries these advantages into another class of telescopes. The present invention has the added advantage of greatly improved spherochromatism and oblique spherical aberration.

An incidental object of the invention is to provide a form of sighting device which is readily adaptable for use with a scanning prism at some distance in front of the object.

An object of one of the particular embodiments described in this specification was to provide an improved telescopic system to fit into a previously existing mount with no increase in dimensions and with a minimum of mechanical change. The invention is applicable however, to various telescopes and gives highly improved image quality whether space is at a premium or not.

Sighting telescopes consist of an objective system for forming an image, substantially in its principal focal plane, of the object being sighted and a viewing system for viewing the image. Even in high quality systems, the viewing system may be nothing more than a compound eyepiece, or it may have one or more relay systems with field lenses interposed near the image plane or planes. Prisms, reticle, beam splitter, filters, and other accessories may also be interposed in known manner.

Prior to the present invention and that described in the above-mentioned copending Altman application, telescopes have been made with critically sharp definition near the axis but with rapidly deteriorating definition in zones further from the axis. The poor image off the axis is largely due to astigmatism and curvature of field. Coma is also important, but all qualified telescope designers are able to eliminate coma.

According to the present invention, a telescopic system is made up in which the objective system is of the type consisting of a Petzval lens and a negative component as a field corrector, and in which the viewing system is broadly of any known type. The field of the telescopic system is overcorrected and matches that of the viewing system, which may include a positive field lens immediately following the field corrector. Altman also employed the overcorrections of field and Petzval sum, but it is surprising that excellent quality can be obtained when this feature is incorporated in a telescope whose objective is a Petzval lens with field corrector. The field corrector of course contributes a large portion of the overcorrection.

I have discovered that this combination gives a remarkably sharp image over the full field of view of the viewing system. Moreover, the manufacturing costs are low, due to the simple construction and the comparatively weak curves of the Petzval type lens. The cost is only slightly greater than that of telescopes with standard types of objective systems, while the quality compares very favorably with that gained by the complicated objectives disclosed by Altman.

The use of a negative component as a field corrector with ordinary telescopic systems (not with Petzval lenses) was proposed a number of years ago, but it suffers from certain drawbacks, and soon fell into disuse. Its chief disadvantage is that the negative component has a dispersive effect upon the principal rays of the system. Either this results in very serious loss of illumination at the edges of the field or a positive field lens of considerable power must be used to counteract the dispersive effect of the negative corrector and the field correcting effect is then largely neutralized also.

The peculiar advantages of the Petzval type lens for use with a negative field corrector in telescope systems seems to have escaped notice until the present time. The zonal spherical aberration of the Petzval lens is known to be remarkably good, as well as its sphero-chromatism. It is also said to tend to decrease the secondary spectrum. Petzval lenses without field correctors have been used as telescope objectives, but the particular usefulness of such lenses in combination with the field corrector lens lies in the fact that the rear positive component is situated comparatively close to the focal plane and has to some degree the effect of a field lens so that a weaker positive field lens suffices behind the focal plane in place of a strong field lens otherwise required, or, in small field viewing systems, the present invention supplies all the field lens effect needed and no additional element is necessary.

Incidentally, objective systems, according to the invention are particularly adaptable to be used with an entrance pupil at some distance in front, for example in the scanning prism of a periscope. The problem here is largely one of correcting coma, and in the Petzval type lens the coma is easy to adjust by bending the components.

Thus the invention differs from that of Altman referred to above, and from all prior telescopic systems by employing an objective system of the type known as a Petzval lens with field corrector. This lens type is well known in photography where the field corrector is commonly referred to as a field flattener, and hence the term is a complete description by itself. In a preferred form of the present invention the field corrector is so strong that it overcorrects the field. Hence the use of the term "field flattener" would be a little inaccurate, and the self-explanatory term "field corrector" is used instead.

The Petzval type lens was developed from the original portrait lens of Petzval and is still widely used in photography, with or without the field flattener. The type may be broadly described as comprising two rather widely separated positive components. The optical separation, defined as the distance from the rear principal point of the front component to the front principal point of the rear component, is generally between ¼F and 1½F where F is the focal length of the objective system. In complexity, known lenses of this type vary from those having a cemented doublet and a simple positive element on the one hand to those having three elements in each component including at least one element of each sign. There is nothing to prevent the use of still more complex forms, if a designer wishes still larger apertures.

Although the invention is fundamentally concerned with the objective system, a few words may be said about the viewing system. It is obvious that the entire viewing system must lie behind the focal plane of the objective system; otherwise the negative field corrector would be in its way. Thus the use of a Huygenian type eyepiece by itself is definitely prevented, but it may be used if a relay lens is interposed. Aside from this limitation a large variety of viewing systems are known, and objective systems according to the invention may be used to great advantage with any of them. A slight modification of curvatures may be advantageous to adjust the coma correction for the changed pupil distance, and this can be done in known manner.

The point is that different known types of eyepieces are best suited to different angular (apparent) fields of view, and that a skilled optical designer will select a type known to be suitable for the angular field required by the problem in hand. He will then adapt it to the pupil distance of that part of the optical system which lies in front of the eyepiece, including an objective according to the invention and with or without a relay lens and cooperating positive field lens, and he will thus be able to reap the benefits of the invention in that the image will be sharp throughout a wider angle of field than with previously known systems of such simple structure.

The type of eyepiece comprising three positive components, at least one of which is compound, is one of the best for covering an extremely wide field, but of course a less expensive one should be used if it satisfies the demands of use.

In the accompanying drawings:

Figs. 1 and 2 show a telescope according to the invention and constructional data for the same.

Figures 3, 4:
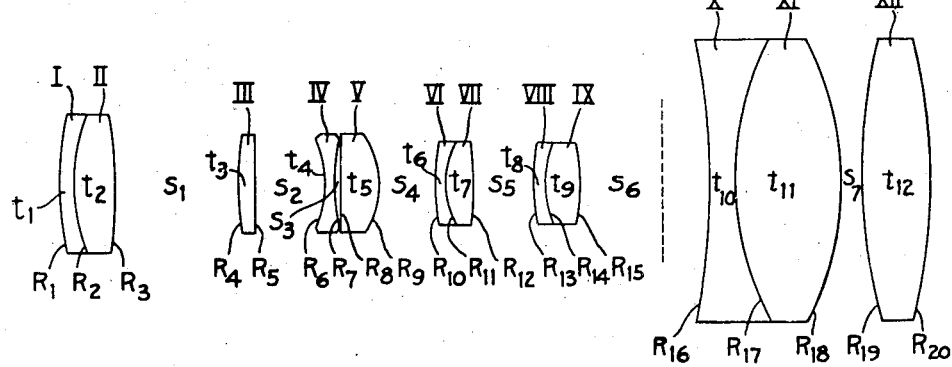
Figs. 3 and 4 show similarly another embodiment of the invention.

In Fig. 1, I is a scanning prism by which the direction of the line of sight may be changed. An antirotation prism II acts as the entrance pupil of the optical system. The objective system consists of lens elements III to VIII inclusive, VII and VIII forming the field corrector thereof.

The viewing system consists of a positive field lens IX immediately behind the objective system, a relay lens of four elements X to XIII, a penta prism XIV, and a highly corrected eyepiece of five elements XV to XIX.

In Fig. 3 the objective system consists of four elements I to IV including a front positive member I, II, a rear positive member III and a field corrector IV. The viewing system includes a positive field lens V in marginal contact with the field corrector, a relay lens group VI to IX, and an eyepiece X to XII of a less complex type.

There are certain details of construction which I have found advantageous in applying the invention to specific optical systems, and for the purpose of describing these preferred details the objective system may be regarded as consisting of three members, a front positive member, a second positive member, and a rear negative member. The two positive members are preferably spaced apart a distance between 0.5F and F measured between their respective facing principal points, where F is the focal length of the objective system. Each of the two positive members preferably has a focal length greater than six-tenths that of the other.

A suitable front member comprises at least two elements including a biconvex element and a negative element of higher refractive index and lower dispersive index. These may conveniently be cemented together. The front bounding surface of the front member may advantageously be given a dioptric power between 0.35 and 1.0 times that of the entire front member.

The second positive member may advantageously have a convex front surface and a weakly curved rear surface with a radius of curvature greater than 1.2F. The rear negative member is in front of and very close to the focal plane, preferably less than 0.08F therefrom and its rear bounding surface should be weaker than its front bounding surface. Obviously the front bounding surface would then necessarily be concave. Good results have been obtained by making the rear surface with dioptric power algebraically between +0.7 and −0.2 times that of the front surface. According to one feature of the invention, the rear surface may be given a small or zero curvature approximating that of the image surface and may be suitably marked for use as a reticle.

The data for the examples shown in the drawings are repeated here:

Example 1, Figs. 1 and 2
[Magnification=3×]

| Lens | N | V | Radii | Thicknesses |
|---|---|---|---|---|
| I. Right Angle Prism | 1.517 | 64.5 | 40 x 40 mm. | $t_1$=40 mm.<br>$s_1$=28.0 |
| II. Dove Prism | 1.517 | 64.5 | 25 x 25 | $t_2$=80.7<br>$s_2$=23.0 |
| III | 1.572 | 57.4 | $R_1$=+194.06 | $t_3$=10.5 |
| IV | 1.617 | 36.6 | $R_2$=−37.96 | $t_4$=3.5 |
|  |  |  | $R_3$=−123.92 | $s_3$=83.7 |
| V | 1.617 | 55.0 | $R_4$=+44.92 | $t_5$=10.5 |
| VI | 1.617 | 36.6 | $R_5$=−160.13 | $t_6$=4.5 |
|  |  |  | $R_6$=+145.19 | $s_4$=18.5 |
| VII | 1.517 | 64.5 | $R_7$=−41.16 | $t_7$=4.0 |
| VIII | 1.584 | 46.0 | $R_8$=+45.22 | $t_8$=11.3 |
| Reticle |  |  | $R_9$=∞ | $s_5$=4.0 |
| IX | 1.673 | 32.2 | $R_{10}$=70.03 | $t_9$=8.0 |
|  |  |  | $R_{11}$=32.77 | $s_6$=115.2 |
| X | 1.649 | 33.8 | $R_{12}$=+108.20 | $t_{10}$=2.9 |
| XI | 1.523 | 58.6 | $R_{13}$=+40.61 | $t_{11}$=4.6 |
|  |  |  | $R_{14}$=−105.03 | $s_7$=4.0 |
| XII | 1.523 | 58.6 | $R_{15}$=+53.83 | $t_{12}$=4.6 |
| XIII | 1.649 | 33.8 | $R_{16}$=−64.31 | $t_{13}$=2.9 |
|  |  |  | $R_{17}$=∞ | $s_8$=4.0 |
| XIV. Pentagon Prism | 1.517 | 64.5 | 36 x 36 | $t_{14}$=122.9<br>$s_9$=48.7 |
|  |  |  | $R_{18}$=−107.40 | $t_{15}$=5.9 |
| XV | 1.673 | 32.2 | $R_{19}$=+51.30 | $t_{16}$=23.5 |
| XVI | 1.517 | 64.5 | $R_{20}$=−51.30 | $s_{10}$=1.2 |
|  |  |  | $R_{21}$=+130.80 | $t_{17}$=12.7 |
| XVII | 1.611 | 58.8 | $R_{22}$=−130.80 | $s_{11}$=1.2 |
|  |  |  | $R_{23}$=+42.99 | $t_{18}$=18.2 |
| XVIII | 1.517 | 64.5 | $R_{24}$=−54.45 | $t_{19}$=5.9 |
| XIX | 1.673 | 32.2 | $R_{25}$=−268.99 |  |

Example 2, Figs. 3 and 4
[Magnification=3×.]

| Lens | $N_D$ | V | Radii | Thicknesses |
|---|---|---|---|---|
| I | 1.617 | 36.6 | $R_1$=+65.26 | $t_1$=2.6 |
| II | 1.572 | 57.4 | $R_2$=+21.46 | $t_2$=8.0 |
|  |  |  | $R_3$=−162.88 | $s_1$=47.0 |
| III | 1.517 | 64.5 | $R_4$=+74.60 | $t_3$=3.3 |
|  |  |  | $R_5$=∞ | $s_2$=27.3 |
| IV | 1.525 | 54.8 | $R_6$=−16.75 | $t_4$=2.3 |
|  |  |  | $R_7$=+30.72 | $s_3$=1.3 |
| V | 1.584 | 46.0 | $R_8$=∞ | $t_5$=7.1 |
|  |  |  | $R_9$=−12.51 | $s_4$=28.8 |
| VI | 1.621 | 36.2 | $R_{10}$=+31.01 | $t_6$=1.4 |
| VII | 1.523 | 58.6 | $R_{11}$=+10.98 | $t_7$=5.4 |
|  |  |  | $R_{12}$=−61.62 | $s_5$=23.8 |
| VIII | 1.621 | 36.2 | $R_{13}$=+22.76 | $t_8$=1.8 |
| IX | 1.523 | 58.6 | $R_{14}$=+11.19 | $t_9$=7.8 |
|  |  |  | $R_{15}$=−294.40 | $s_6$=98.6 |
| X | 1.649 | 33.8 | $R_{16}$=−128.27 | $t_{10}$=5.0 |
| XI | 1.517 | 64.5 | $R_{17}$=+48.78 | $t_{11}$=21.2 |
|  |  |  | $R_{18}$=−48.78 | $s_7$=3.6 |
| XII | 1.517 | 64.5 | $R_{19}$=+81.62 | $t_{12}$=14.3 |
|  |  |  | $R_{20}$=−81.62 |  |

A number of notable features of these two telescopes are summarized in the following table, including the preferred features of the invention not directly evident from the above table of data:

|  | Ex. 1 | Ex. 2 |
|---|---|---|
| Focal length of objective system: |  |  |
| (1) as a whole (F) | 100.0 mm. | 80.5 mm. |
| (2) front member alone | +1.50F | +1.17F |
| (3) second member alone | +0.99F | +1.8F |
| (4) negative member alone | −0.91F | −0.25F |
| Two front members: |  |  |
| (5) Ratio of focal length (3):(2) | 0.66 | 1.54 |
| (6) Spacing apart | 0.84F | 0.58F |
| Front member alone: |  |  |
| (7) Index difference, $N_{II}-N_I$ | +.045 | −.045 |
| (8) Dioptric power of whole front member | +6.67 | +10.8 |
| (9) Dioptric power of front surface alone | +2.95 | +9.4 |
| (10) Ratio (9):(8) | +0.44 | +0.87 |
| Second member alone: |  |  |
| (11) Radius of curvature, front surface | +0.45F | +0.93F |
| (12) Radius of curvature, rear surface | +1.45F | ∞ |
| Negative member alone: |  |  |
| (13) Distance from focal plane | 0.00 | 0.016F |
| (14) Dioptric power of front surface | −12.5 | −31.37 |
| (15) Dioptric power of rear surface | 0.0 | −13.57 |
| (16) Ratio (15):(14) | 0.0 | +0.43 |
| Field angle at which field was computed: | 10° | 3.5° |
| (17) Sagittal field | +1.20 mm. | +1.46 mm. |
| (18) Tangential field | +5.78 mm. | 2.11 mm. |
| Magnification ratio of erecting system | 1.17 | 2.15 |
| Focal length of eyepiece | 39.1 | 57.1 |

From these tables and the figures it is readily seen that in both examples the two front members are spaced apart a distance between 0.5F and F and each of them has a focal length greater than 0.6 times that of the other. However, in Ex. 1 the second component has the shorter focal length, and in Ex. 2 it has the longer.

The front member consists entirely of a single component made up of a positive element cemented to a negative element. In Ex. 1 the positiev element is in front whereas in Ex. 2 it is behind the negative element. In each case the refractive index of the negative element is greater than that of the positive element by 0.045. As is well known to lens designers, this difference in index should be greater than 0.01. On the other hand, I find it preferable that it be less than about 0.15 or 0.20.

The second member consists of a single component in both examples. In Ex. 1 it is a cemented doublet purely for correcting chromatic aberrations, the refractive indices of the two elements being as nearly the same as practicable. Making this index greater than 1.6 is helpful in controlling the Petzval sum. In Ex. 2 this component is a simple positive element plano-convex and very economical to manufacture.

It is to be pointed out that within the scope of the invention either of the front two members may be made of a more complex structure for the purpose of further correcting the aberrations so as to use a larger aperture or field.

The front surface of the second member is convex in both examples. The rear surface is concave in one example and plano in the other, the radius of curvature being greater than 1.2 F in each case. It could also be weakly convex, but if it is convex the radius of curvature is preferably greater than 2.0 F.

In the negative member close to the focal plane, the dioptric power of the rear surface is algebraically between +0.7 (which would mean a concave rear surface) and −0.2 (which would mean a convex rear surface) times that of the front surface of the negative member.

Although the present invention is primarily directed toward improvements in the objective system, there are also certain features of the viewing system which cooperate therewith. In order to use the invention to the fullest advantage, the viewing system must have large enough apertures substantially to match those of the objective as regards both pupil size and angular field. Some types of eyepiece are superior in covering a wide field, particularly the known type comprising three positive components of which at least one is compound. Example 1 shows this type of eyepiece. Example 2 was designed for less exacting requirements, i. e. for a small angular field, and since the problem was to improve an existing telescope with few changes, the same eyepiece was retained without change. It is, of course, more economical to manufacture than the eyepiece of Example 1.

Both of these telescopes are of a commonly used type in which the viewing system comprises a field lens, an erecting or relay lens, an eyepiece and, optionally, prisms and other accessories. In applying the invention to this type of telescope, I have found it preferable to mount the field lens less than 0.1F from the rear surface of the objective. In Example 2 the field lens is actually in peripheral contact with the rear of the objective. The front surface of the field lens is preferably weaker than the rear surface. I have found as in the case of the negative member of the objective, that this surface may conveniently be made with its dioptric power algebraically between +0.7 and −0.2 times that of the other surface of the field lens. The refractive index of this lens should be above 1.56 and preferably above 1.64, and may be as high as suitable glasses permit. Glasses are known with indices about 2.1.

It is usual in telescopes of this type for the relay lens to work at a magnification between 0.5 and 4.0.

These examples embody some of the principles disclosed in Altman's copending application Serial No. 511,062, "Sighting devices," in that the curvature of field of the objective system is overcorrected and substantially matches the undercorrected curvature of field of the viewing system. Furthermore, in Example 1 the objective has eight optical surfaces not counting the one coinciding with the focal plane and therefore having little or no effect on the aberration. This fact further corroborates Altman's statement, in the case above referred to, that at least eight refracting surfaces are essential in an objective for a sighting system covering a wide angle. Example 2 has less than eight, but it covers a more moderate angle of field.

What I claim is:

1. A sighting telescope comprising in combination an objective system for forming substantially at its principal focal plane an image of the object being sighted and a viewing system for viewing said image, all in optical alignment, in which the objective system comprises three members namely a front positive member, a second positive member and a negative member close to and in front of the focal plane, the two positive members being spaced apart between 0.5F and F where F is the focal length of the objective, each of the two positive members having a focal length greater than 0.6 times that of the other, the front member comprising at least two elements including a biconvex element cemented to a negative element of higher refractive index and lower dispersive index, the front bounding surface of the front member having a dioptric power between 0.35 and 1.0 times that of the entire front member, the second positive member having a convex front surface and a weakly curved rear surface with a radius of curvature greater than 1.2F, the negative member consisting of an unsymmetrical component with its weaker surface toward the rear, and the viewing system being entirely behind the focal plane of the objective and including a compound eyepiece consisting of a plurality of components at least one of which is compound, and which are spaced apart an aggregate distance less than one-third the focal length of the eyepiece.

2. A sighting telescope according to claim 1 in which each positive member of the objective consists of at most two elements.

3. A sighting telescope according to claim 1 in which the viewing system includes as one of its members an unsymmetrical positive component with its weaker surface to the front adjacent the rear of the objective system and spaced less than 0.1F therefrom.

4. A sighting telescope according to claim 1 in which both positive members of the objective system are compound, each consisting of a biconvex element cemented to a negative element of lower dispersive index.

5. A sighting telescope in which the objective system is substantially according to the following specifications:

| Lens | N | V | Radii | Thicknesses |
|---|---|---|---|---|
| I | 1.57 | 57 | $R_1=+1.9F$ | $t_1=0.1F$ |
| II | 1.62 | 37 | $R_2=-0.4F$ | |
| | | | $R_3=-1.2F$ | $t_2<0.08F$ |
| | | | | $s_1=0.8F$ |
| III | 1.62 | 55 | $R_4=+0.4F$ | |
| | | | | $t_3=0.1F$ |
| IV | 1.62 | 37 | $\frac{F}{2}<-R_5<2F$ | $t_4<0.09F$ |
| | | | $R_6=+1.5F$ | |
| | | | | $s_2=0.2F$ |
| V | 1.52 | 64 | $R_7=-0.4F$ | |
| | | | | $t_5<0.08F$ |
| VI | 1.58 | 46 | $\frac{F}{5}<R_8<F$ | $t_6=0.1F$ |
| | | | $\pm R_9>10F$ | | where the first column designates the lens elements by Roman numerals in order from front to rear and where F is the focal length of the objective, N is the index of refraction for the D line of the spectrum, V is the dispersive index, R, t, and s refer respectively to the radii of curvature of the refractive surfaces, the axial thicknesses of the elements, and the airspaces between the components, the subscripts on these refer to the spaces numbered consecutively from the front and the + and − signs in the fourth column correspond to surfaces which are respectively convex and concave to the front.

6. A sighting telescope in which the objective system is substantially according to the following specifications:

| Lens | N | V | Radii | Thicknesses |
|---|---|---|---|---|
| I | 1.62 | 37 | $R_1=+0.7F$ | $t_1<0.06F$ |
| II | 1.57 | 57 | $R_2=+0.2F$ | $t_2=0.1F$ |
|  |  |  | $R_3=-1.6F$ | $s_1=0.5F$ |
| III | 1.52 | 64 | $R_4=+0.7F$ | $t_3<0.07F$ |
|  |  |  | $\pm R_5>10F$ | $s_2=0.3F$ |
| IV | 1.52 | 55 | $R_6=-0.2F$ | $t_4<0.06F$ |
|  |  |  | $R_7=+0.3F$ |  | where the first column designates the lens elements by Roman numerals in order from front to rear and where F is the focal length of the objective, N is the index of refraction for the D line of the spectrum, V is the dispersive index, R, t, and s refer respectively to the radii of curvature of the refractive surfaces, the axial thicknesses of the elements, and the airspaces between the components, the subscripts on these refer to the surfaces, the elements and the spaces numbered consecutively from the front, and the + and − signs in the fourth column correspond to surfaces which are respectively convex and concave to the front.

7. A telescopic system comprising an objective system and a viewing system in optical alignment on opposite sides of a focal plane, in which the objective system comprises two positive members each with a dioptric power greater than 0.6 times that of the other and separated a distance between principal points greater than 0.25F and less than 1.5F where F is the focal length of the objective system, and at least the front one of the positive members being compound, and in combination therewith a single negative component as a field correcting lens immediately adjacent to the focal plane, the objective system forming a backward curving image of distant objects at the focal plane, and in which the viewing system has a field curvature substantially matching that of the objective system and comprises at least three positive components of which at least one is compound and another is a simple positive element with its weaker surface facing the focal plane and separated therefrom by less than 0.1F.

WILLY SCHADE.

REFERENCES CITED

The following references are of record in the file of this patent:

UNITED STATES PATENTS

| Number | Name | Date |
|---|---|---|
| 815,657 | Swasey | Mar. 20, 1906 |
| 869,395 | Schleth | Oct. 29, 1907 |
| 940,894 | Von Rohr | Nov. 23, 1909 |
| 1,468,762 | Taylor et al. | Sept. 25, 1923 |
| 1,478,704 | Erfle | Dec. 25, 1923 |
| 1,865,977 | Sonnefeld | July 5, 1932 |
| 2,050,024 | Sonnefeld | Aug. 4, 1936 |
| 2,076,190 | Wood | Apr. 6, 1937 |
| 2,187,780 | Gehrke et al. | Jan. 23, 1940 |
| 2,276,284 | Burka et al. | Mar. 17, 1942 |

FOREIGN PATENTS

| Number | Country | Date |
|---|---|---|
| 501,456 | Germany | July 14, 1930 |